(12) United States Patent
He et al.

(10) Patent No.: US 12,127,010 B2
(45) Date of Patent: Oct. 22, 2024

(54) QUASI CO-LOCATION HYPOTHESIS DETERMINATION METHOD AND APPARATUS, STORAGE MEDIUM AND ELECTRONIC APPARATUS

(71) Applicant: ZTE Corporation, Shenzhen (CN)

(72) Inventors: Zhen He, Shenzhen (CN); Shujuan Zhang, Shenzhen (CN); Chuangxin Jiang, Shenzhen (CN); Bo Gao, Shenzhen (CN); Yu Ngok Li, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 229 days.

(21) Appl. No.: 17/635,447

(22) PCT Filed: Aug. 12, 2020

(86) PCT No.: PCT/CN2020/108705
§ 371 (c)(1),
(2) Date: Feb. 15, 2022

(87) PCT Pub. No.: WO2021/027849
PCT Pub. Date: Feb. 18, 2021

(65) Prior Publication Data
US 2022/0338021 A1    Oct. 20, 2022

(30) Foreign Application Priority Data
Aug. 15, 2019 (CN) .......................... 201910755329.1

(51) Int. Cl.
*H04W 16/28* (2009.01)
*H04L 5/00* (2006.01)

(52) U.S. Cl.
CPC ............. *H04W 16/28* (2013.01); *H04L 5/001* (2013.01); *H04L 5/0051* (2013.01); *H04L 5/0092* (2013.01)

(58) Field of Classification Search
CPC ...... H04W 16/28; H04L 5/001; H04L 5/0051; H04L 5/0092
See application file for complete search history.

(56) References Cited

U.S. PATENT DOCUMENTS
2019/0141693 A1    5/2019   Guo et al.

FOREIGN PATENT DOCUMENTS
CN    107251450 A    10/2017
CN    108633029 A    10/2018
(Continued)

OTHER PUBLICATIONS
International Search Report for corresponding application PCT/CN2020/108705 filed Aug. 12, 2020; Mail date Nov. 17, 2020.
(Continued)

*Primary Examiner* — Ronald B Abelson
(74) *Attorney, Agent, or Firm* — CANTOR COLBURN LLP (57) ABSTRACT

Provided are a Quasi-Colocation (QCL) hypothesis determination method and apparatus, a storage medium and an electronic apparatus. The method includes: a second communication node determining, according to a Transmission Configuration Indication (TCI) state indicated by a first communication node for receiving a target downlink reference signal or channel of a second-type Component Carrier (CC) or Bandwidth Part (BWP), a QCL hypothesis of the target downlink reference signal or channel of the second-type CC or BWP, wherein the TCI state is associated with at least one of following pieces of configuration information: a first source reference signal, a second source reference
(Continued)

signal, a set of offsets of a first source reference signal, and a set of CC or BWP indexes corresponding to offsets of a first source reference signal.

20 Claims, 4 Drawing Sheets

(56) References Cited

FOREIGN PATENT DOCUMENTS

| | | | |
|---|---|---|---|
| CN | 109391962 A | 2/2019 | |
| CN | 109997398 A | 7/2019 | |
| CN | 111082909 A | 4/2020 | |
| JP | 2019118036 A | 7/2019 | |
| RU | 2613526 C1 | 3/2017 | |
| RU | 2687966 C2 | 5/2019 | |
| WO | 2019099659 A1 | 5/2019 | |
| WO | 2019136728 A1 | 7/2019 | |

OTHER PUBLICATIONS

Nokia, "Feature Lead Summary on QCL", 3GPP TSG RAN WG1#93 R1-1807664, May 25, 2018.
ZTE. "Clarification on the case of configured TCI states without QCL-TypeD", 3GPP TSG RAN WGI Meeting #97 R1-1906257, May 17, 2019.
European Search Report for corresponding application EP20852538; Report dated Aug. 22, 2022.
Indian Office Action for corresponding application 202217012105; Mail date Mar. 1, 2024.
Russian Search Report for corresponding application 2022106235/07; Nov. 27, 2023.

A second communication node determines, according to a TCI state indicated by a first communication node for receiving a target downlink reference signal or channel of a second-type CC or BWP, a QCL hypothesis of the target downlink reference signal or channel of the second-type CC or BWP — S102

QUASI CO-LOCATION HYPOTHESIS DETERMINATION METHOD AND APPARATUS, STORAGE MEDIUM AND ELECTRONIC APPARATUS

CROSS REFERENCE

This application is a National Stage Filing of the PCT International Application No. PCT/CN2020/108705 filed on Aug. 12, 2020, which claims priority to Chinese Application No. 201910755329.1 filed on Aug. 15, 2019, the entirety of which is herein incorporated by reference.

TECHNICAL FIELD

The present disclosure relates to the field of communications, and more particularly to a Quasi-Colocation (QCL) hypothesis determination method and apparatus, a storage medium and an electronic apparatus.

BACKGROUND

A beam indication method, in particular, receiving beam indication of a physical downlink reference signal or channel, such as a Physical Downlink Control Channel (PDCCH), a Physical Downlink Shared Channel (PDSCH) and Channel State Information Reference Signals (CSI-RS) specifically includes the following operations. Firstly, a Transmission Configuration Indication (TCI) state is activated or a TCI state set is selected via a Medium Access Control (MAC)-Control Element (CE) signaling. Then, a QCL hypothesis of a target downlink reference signal or channel is determined according to the TCI state. As an exemplary implementation, a receiving beam of the target downlink reference signal or channel is determined according to a source reference signal configured in QCL-Type D associated with the TCI state. The whole procedure is restricted to a single serving cell or a Component Carrier (CC) or a Bandwidth Part (BWP).

However, in a Carrier Aggregation (CA) scenario, User Equipment (UE) may support a maximum of 16 CCs or BWPs in a downlink connection. In such a case, it is required to activate a TCI state (or select a TCI state set) via a MAC-CE signaling on each CC or BWP to complete beam indications of PDCCHs, PDSCHs and CSI-RSs on all the CCs or BWPs, and thus a maximum of 16 MAC-CE signaling would be required. For example, the same beam is indicated for PDCCHs on 16 CCs or BWPs by 16 TCI states activated by 16 MAC-CE signalings, resulting in a large signaling overhead. Aiming at the above problems in the related art, no effective solution has been proposed yet.

SUMMARY

Embodiments of the present disclosure provide a QCL hypothesis determination method and apparatus, a storage medium and an electronic apparatus, which may solve at least the problem of a large signaling overhead caused by activation of a TCI state or a TCI state subset on each CC respectively via a MAC-CE signaling for achieving a beam indication of a PDCCH, a PDSCH or a CSI-RS in the related art.

According to an aspect of the embodiments of the present disclosure, a QCL hypothesis determination method is provided. A second communication node determines, according to a TCI state indicated by a first communication node for receiving a target downlink reference signal or channel of a second-type CC or BWP, a QCL hypothesis of the target downlink reference signal or channel of the second-type CC or BWP. The indicated TCI state is associated with at least one of following pieces of configuration information: a first source reference signal, a second source reference signal, a set of offsets of a first source reference signal, and a set of CC or BWP indexes corresponding to offsets of a first source reference signal. The first source reference signal refers to a source reference signal that is transmitted on a first-type CC or BWP and provides a first QCL type. The second source reference signal refers to a source reference signal that is transmitted on the first-type CC or BWP and provides a second QCL type. The first-type CC or BWP and the second-type CC or BWP are configured in a same CC group or BWP group.

According to another aspect of the embodiments of the present disclosure, a beam indication apparatus is provided. A determination module is configured to determine, according to a TCI state indicated by a first communication node for receiving a target downlink reference signal or channel of a second-type CC or BWP, a QCL hypothesis of the target downlink reference signal or channel of the second-type CC or BWP. The indicated TCI state is associated with at least one of following pieces of configuration information: a first source reference signal, a second source reference signal, a set of offsets of a first source reference signal, and a set of CC or BWP indexes corresponding to offsets of a first source reference signal. The first source reference signal refers to a source reference signal that is transmitted on a first-type CC or BWP and provides a first QCL type. The second source reference signal refers to a source reference signal that is transmitted on the first-type CC or BWP and provides a second QCL type. The first-type CC or BWP and the second-type CC or BWP are configured in a same CC group or BWP group.

Through the embodiments of the present disclosure, a second communication node determines, according to a TCI state indicated by a first communication node for receiving a target downlink reference signal or channel of a second-type CC or BWP, a QCL hypothesis of the target downlink reference signal or channel of the second-type CC or BWP. The indicated TCI state is associated with at least one of following pieces of configuration information: a first source reference signal, a second source reference signal, a set of offsets of a first source reference signal, and a set of CC or BWP indexes corresponding to offsets of a first source reference signal. The first source reference signal refers to a source reference signal that is transmitted on a first-type CC or BWP and provides a first QCL type. The second source reference signal refers to a source reference signal that is transmitted on the first-type CC or BWP and provides a second QCL type. The first-type CC or BWP and the second-type CC or BWP are configured in a same CC group or BWP group. The problem of a large signaling overhead caused by activation of a TCI state or a TCI state subset on each CC respectively via a MAC-CE signaling for achieving a beam indication of a PDCCH, a PDSCH or a CSI-RS in the related art is solved.

DETAILED DESCRIPTION

The present disclosure is described below with reference to the drawings and in conjunction with the embodiments in detail.

It is to be noted that the specification and claims of the present disclosure and the terms "first", "second" and the like in the drawings are used to distinguish similar objects, and are not used for limiting a specific sequence or a precedence order.

Figure 1:
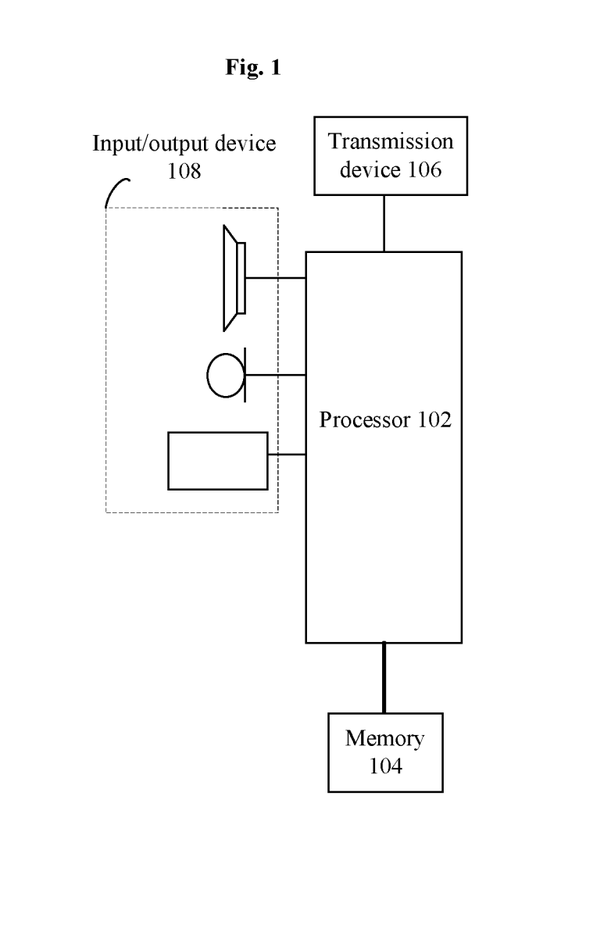
FIG. 1 is a block diagram of a hardware structure of a mobile terminal for implementing a QCL hypothesis determination method according to an embodiment of the present disclosure.

The method embodiment provided by the embodiments of the present disclosure may be implemented in a mobile terminal, a computer terminal or a similar computing device. Running on a mobile terminal is taken as an example. FIG. 1 is a block diagram of a hardware structure of a mobile terminal for implementing a QCL hypothesis determination method according to an embodiment of the present disclosure. As shown in FIG. 1, a mobile terminal 10 may include one or more (only one is shown in FIG. 1) processors 102 (the processor 102 may include but is not limited to a processing apparatus such as a Micro Controller Unit (MCU) or a Field Programmable Gate Array (FPGA)) and a memory 104 for storing data. Optionally, the above mobile terminal may further include a transmission device 106 and an input/output device 108 for communication functions. Those having ordinary skill in the art can understand that the structure shown in FIG. 1 is merely illustrative, and does not limit the structure of the above mobile terminal. For example, the mobile terminal 10 may also include more or fewer components than shown in FIG. 1, or has a different configuration from that shown in FIG. 1.

The memory 104 may be configured to store a computer program, for example, a software program and module of application software, such as a computer program corresponding to a QCL hypothesis determination method in the embodiments of the present disclosure. The processor 102 executes various functional applications and data processing, that is, implements the above method by running the computer program stored in the memory 104. The memory 104 may include a high speed random access memory and may also include a non-volatile memory such as one or more magnetic storage devices, a flash memory, or other non-volatile solid state memories. In some examples, the memory 104 may further include memories remotely located relative to the processor 102, which may be connected to the mobile terminal 10 over a network. The examples of such networks include, but are not limited to, the Internet, the Intranet, local area networks, mobile communication networks, and combinations thereof.

The transmission device 106 is configured to receive or send data via a network. The above specific network examples may include a wireless network provided by a communication provider of the mobile terminal 10. In an example, the transmission apparatus 106 includes a Network Interface Controller (NIC) that may be connected to other network devices through the base station to communicate with the Internet. In an example, the transmission device 106 may be a Radio Frequency (RF) module for communicating with the Internet wirelessly.

Figure 2:
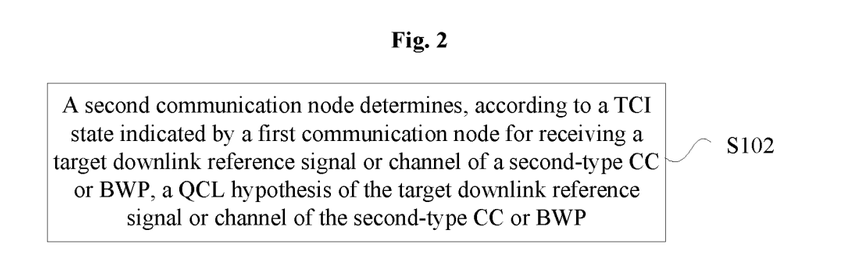
FIG. 2 is a flowchart of a QCL hypothesis determination method according to an embodiment of the present disclosure.

A QCL hypothesis determination method running on the above mobile terminal or network architecture is provided in the present embodiment. FIG. 2 is a flowchart of a QCL hypothesis determination method according to an embodiment of the present disclosure. As shown in FIG. 2, the flow includes the following operations.

In operation S202, a second communication node determines, according to a TCI state indicated by a first communication node for receiving a target downlink reference signal or channel of a second-type CC or BWP, a QCL hypothesis of the target downlink reference signal or channel of the second-type CC or BWP.

The indicated TCI state is associated with at least one of following pieces of configuration information: a first source reference signal, a second source reference signal, a set of offsets of a first source reference signal, and a set of CC or BWP indexes corresponding to offsets of a first source reference signal.

The first source reference signal refers to a source reference signal that is transmitted on a first-type CC or BWP and provides a first QCL type. The second source reference signal refers to a source reference signal that is transmitted on the first-type CC or BWP and provides a second QCL type. The first-type CC or BWP and the second-type CC or BWP are configured in a same CC group or BWP group.

In an implementation, the method of the present disclosure may further include the following operations. The second communication node determines a third source reference signal according to a preset rule and the configuration information associated with the indicated TCI state. The preset rule includes at least one of a first preset rule, a second preset rule and a third preset rule. The third source reference signal refers to a source reference signal that is transmitted on the second-type CC or BWP and provides the first QCL type for the target downlink reference signal or channel.

In an implementation of the present disclosure, the method of the present disclosure may further include the following operations. The second communication node determines the third source reference signal according to the first preset rule and the first source reference signal associated with the indicated TCI state.

The first preset rule includes at least one of the following: the first source reference signal is configured as a reference signal of the third source reference signal; the first source reference signal is configured as a reference signal of a first reference signal associated with the third source reference signal; the first source reference signal is configured in a second QCL type of a TCI state applied to the third source reference signal; the first source reference signal is configured in a second QCL type of a TCI state applied to a first reference signal associated with the third source reference signal; a second reference signal associated with the first source reference signal is configured in a second QCL type of a TCI state applied to the third source reference signal; the fourth source reference signal is configured in a second QCL type of a TCI state applied to the third source reference signal; and the fourth source reference signal is configured in a second QCL type of a TCI state applied to a first reference signal associated with the third source reference signal. The first reference signal includes a periodic CSI-RS transmitted on the second-type CC or BWP. The second reference signal includes a periodic CSI-RS transmitted on the first-type CC or BWP. The fourth source reference signal is configured in a second QCL type of a TCI state applied to the first source reference signal.

In an implementation of the present disclosure, the method of the present disclosure may further include the following operations. The second communication node determines the third source reference signal according to the second preset rule and the second source reference signal associated with the indicated TCI state.

The second preset rule includes at least one of the following: the second source reference signal is configured in a second QCL type of a TCI state applied to the third source reference signal; and the second source reference signal is configured in a second QCL type of a TCI state applied to a first reference signal associated with the third source reference signal. The first reference signal includes a periodic CSI-RS transmitted on the second-type CC or BWP. The second source reference signal is configured in a first QCL type and a second QCL type of a TCI state applied to the third source reference signal.

In an implementation of the present disclosure, the method of the present disclosure may further include the following operations. The second communication node determines the third source reference signal according to the third preset rule and the first source reference signal or the second source reference signal associated with the indicated TCI state.

The third preset rule includes at least one of the following: the first source reference signal or the second source reference signal is configured in a first QCL type of a TCI state applied to the third source reference signal; the first source reference signal or the second source reference signal is configured in a second QCL type of a TCI state applied to the third source reference signal; and the first source reference signal or the second source reference signal is configured in a first QCL type and a second QCL type of a TCI state applied to the third source reference signal.

It is to be noted that the first source reference signal or the second source reference signal includes an SSB transmitted on the first-type CC.

In an implementation of the present disclosure, the method of the present disclosure may further include the following operations. The second communication node determines the third source reference signal according to the first source reference signal associated with the indicated TCI state, the set of offsets of the first source reference signal, and the set of CC or BWP indexes corresponding to the offsets of the first source reference signal.

In an implementation of the present disclosure, the method of the present disclosure may further include the following operations. In a case where a first preset condition is satisfied, the second communication node determines a fifth source reference signal according to a reference signal configured in a second QCL type of a TCI state of a Control Resource Set (CORESET), that is used for scheduling a target downlink reference signal or channel of the second-type CC or BWP, on the first-type CC or BWP.

The fifth source reference signal refers to a source reference signal that is transmitted on the first-type CC or BWP or the second-type CC or BWP and provides a second QCL type for the target downlink reference signal or channel.

In an implementation of the present disclosure, the method of the present disclosure may further include the following operations. In a case where a first preset condition is satisfied, the second communication node determines a fifth source reference signal according to a reference signal configured in a second QCL type of a TCI state of a CORESET having a minimum CORESET ID on the first-type CC.

In an implementation of the present disclosure, the method of the present disclosure may further include the following operations. In a case where a first preset condition is satisfied, the second communication node determines, according to a candidate TCI state indicated by the first communication node for receiving the target downlink reference signal or channel of the second-type CC or BWP, a QCL hypothesis of the target downlink reference signal or channel of the second-type CC or BWP.

The candidate TCI state is associated with at least one of following pieces of configuration information: a first source reference signal, a second source reference signal, a set of offsets of a first source reference signal, and a set of CC or BWP indexes corresponding to offsets of a first source reference signal.

In an implementation of the present disclosure, the first preset condition in the present disclosure includes: a time interval between a target downlink reference signal or channel on the second-type CC or BWP and a CORESET for scheduling the target downlink reference signal or channel is smaller than a preset threshold.

In an implementation of the present disclosure, the method of the present disclosure may further include the following operations. The second communication node determines the first source reference signal and a third source reference signal according to a fourth preset rule. The third source reference signal refers to a source reference signal that is transmitted on the second-type CC or BWP and provides the first QCL type for the target downlink reference signal or channel.

The fourth preset rule includes: the first source reference signal is a CSI-RS that is transmitted on the first-type CC or BWP, has a minimum CSI-RS resource ID and is configured with TRS-Info; and the third source reference signal is a CSI-RS that is transmitted on the second-type CC or BWP, has a minimum CSI-RS resource ID and is configured with TRS-Info.

In an implementation of the present disclosure, the method of the present disclosure may further include the following operations. Before the second communication node receives the TCI state indicated by the first communication node for receiving the target downlink reference signal or channel of the second-type CC or BWP, the second communication node determines the indicated TCI state according to a first TCI state in a TCI state set configured by the first communication node for a reference CC or BWP.

The first TCI state is associated with at least one of following pieces of configuration information: a first source reference signal, a second source reference signal, a set of offsets of a first source reference signal, and a set of CC or BWP indexes corresponding to offsets of a first source reference signal. The reference CC or BWP, the first-type CC or BWP and the second-type CC or BWP are configured in a same CC group or BWP group.

In an implementation of the present disclosure, the second communication node is capable of obtaining the first TCI state according to at least one of following manners: the first TCI state is the 1st TCI state in the TCI state set; and the first communication node activates the first TCI state from the TCI state set via an activation command.

In an implementation of the present disclosure, the reference CC or BWP includes at least one of: a CC or BWP having a minimum CC or BWP index in the CC group or BWP group; a CC or BWP having a minimum interval from an index of the second-type CC or BWP in the CC group or BWP group; and a CC or BWP that is closest to a frequency domain position of the second-type CC or BWP in the CC group or BWP group.

Through the description of the above implementations, those having ordinary skill in the art can clearly understand that the method according to the above embodiment may be implemented by means of software plus a necessary general hardware platform, and of course, may also be implemented through hardware, but in many cases, the former is a better implementation. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

In the embodiments, a QCL hypothesis determination apparatus is also provided. The apparatus is used to implement the above embodiments and exemplary implementations, and those have not been described will not be elaborated. As used below, the term "module" may implement a combination of software and/or hardware of a predetermined function. Although the apparatus described in the following embodiments is preferably implemented by software, hardware or a combination of software and hardware is also possible and conceived.

Figure 3:
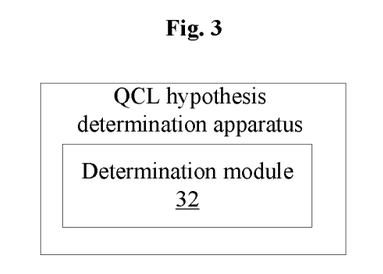
FIG. 3 is a structural schematic diagram of a QCL hypothesis determination apparatus according to an embodiment of the present disclosure.

FIG. 3 is a structural schematic diagram of a QCL hypothesis determination apparatus according to the present disclosure. The apparatus is applied to a second communication node side. As shown in FIG. 3, the apparatus includes: a determination module 32.

The determination module 32 is configured to determine, according to a TCI state indicated by a first communication node for receiving a target downlink reference signal or channel of a second-type CC or BWP, a QCL hypothesis of the target downlink reference signal or channel of the second-type CC or BWP.

The indicated TCI state is associated with at least one of following pieces of configuration information: a first source reference signal, a second source reference signal, a set of offsets of a first source reference signal, and a set of CC or BWP indexes corresponding to offsets of a first source reference signal.

The first source reference signal refers to a source reference signal that is transmitted on a first-type CC or BWP and provides a first QCL type. The second source reference signal refers to a source reference signal that is transmitted on the first-type CC or BWP and provides a second QCL type. The first-type CC or BWP and the second-type CC or BWP are configured in a same CC group or BWP group.

It is to be noted that each of the above modules may be implemented by software or hardware. For the latter, it may be implemented by, but not limited to, the following manners that the above modules are all located in the same processor; or, the above modules are located in different processors in any combination form respectively.

Examples 1 to 8 of the present disclosure are illustrated below in conjunction with some examples of the present disclosure.

Example 1

In the present example, a CC or BWP group configuration method is provided. The configuration mode of a CC or BWP group may include at least one of the following:

1) All CCs or BWPs within a broadband are designated as one CC or BWP group.

2) A base station configures the CC or BWP group via RRC signaling.

3) A UE is capable of reporting the CC or BWP group. For example, different CCs or BWPs send downlink reference signals or channels (such as CSI-RS, PDCCH and PDSCH) to the same UE. If these downlink channels or signals overlap at a time domain position (overlap, e.g. at an initial position), the UE may report CC or BWP indexes associated with these downlink channels or signals, i.e. the CC or BWP group includes CCs or BWPs corresponding to these CC or BWP indexes.

4) The UE reports the CC or BWP group after measurement. For example, after measuring CSI, the UE finds that some CCs or BWPs have the same optimal receiving beam, and then the UE may report these CCs or BWP indexes, i.e. the CC or BWP group includes CCs or BWPs corresponding to these CCs or BWP indexes.

Further, the number of CCs or BWPs included in one CC or BWP group is smaller than or equal to $N_{max}$, where $N_{max}$ refers to a maximum number of CCs or BWPs supportable by the UE.

Note: for convenience of description, CC referred to in the following embodiments represents a CC or BWP, and CC group represents a CC or BWP group.

It is to be noted that Examples 2 to 5 relate to a QCL hypothesis determination method for, but not limited to, a PDSCH. The method is also applicable to a PDCCH, and the determination of QCL hypothesis of a CSI-RS used for obtaining CSI.

Example 2

The present example provides a QCL hypothesis determination method for a PDSCH of a CC group. It is assumed that a CC group includes CC1 and CC2. SSB1 and CSI-RS1 are transmitted on CC1, and CSI-RS2 is transmitted on CC2. A base station indicates one TCI state for receiving a target PDSCH of the CC group. The TCI state is associated with the following configuration information: a first source reference signal and a second source reference signal. The first source reference signal refers to a source reference signal that is transmitted on a first-type CC and provides a first QCL type, and the second source reference signal refers to a source reference signal that is transmitted on the first-type CC and provides a second QCL type. It is assumed here that the first source reference signal and the second source reference signal are respectively SSB1 and CSI-RS1. The first-type CC may be a CC with a minimum CC index in the CC group or a primary serving cell (PCell), i.e. CC1. The first QCL type refers to QCL-Type A, indicating that the target reference signal and the source reference signal have the same demodulation parameters (such as Doppler frequency shift, Doppler spread, average delay, and delay spread). The second QCL type refers to QCL-Type D, indicating that the target reference signal and the source reference signal have the same receiving space parameter, i.e. having the same receiving beam. SSB1 is configured in QCL-Type D applied to CSI-RS1, i.e. SSB1 and CSI-RS1 have the same receiving beam. After a UE receives the above indicated TCI state, SSB1 provides QCL-Type D for a target PDSCH of the first-type CC and the second-type CC (i.e. a source reference signal of QCL-Type D of the target PDSCH of the second-type CC is determined according to a second source reference signal, and is also SSB1, which is applicable to Examples 2 to 5). The second-type CC may be a CC other than the first-type CC in the CC group, such as CC2, i.e. the PDSCH of the first-type CC and the PDSCH of the second-type CC have the same receiving beam as SSB1. CSI-RS1 provides QCL-Type A for the target PDSCH of the first-type CC, i.e. the target PDSCH of the first-type CC has the same demodulation parameter as CSI-RS1. For the first QCL type of the target PDSCH of the second-type CC, such as QCL-Type A, the UE may determine a third source reference signal according to a first preset rule and the first source reference signal (SSB1) associated with the indicated TCI state. The third source reference signal is transmitted on CC2 (assumed to be CSI-RS2), and provides QCL-Type A for the target PDSCH of the second-type CC, i.e. the target PDSCH of the second-type CC and CSI-RS2 have the same demodulation parameter.

Figure 4:
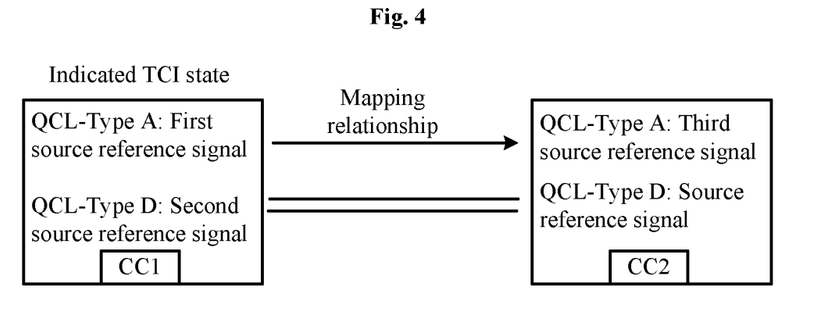
FIG. 4 is a schematic diagram of a mapping relationship between Synchronization Signal Block (SSB)1 and CSI-RS2 according to an embodiment of the present disclosure.

Further, the first preset rule may include at least one of the following:

1) The first source reference signal (SSB1) is configured as a reference signal of the third source reference signal (CSI-RS2). In other words, SSB1 has a mapping relationship with CSI-RS2, as shown in FIG. 4.

Figure 5:
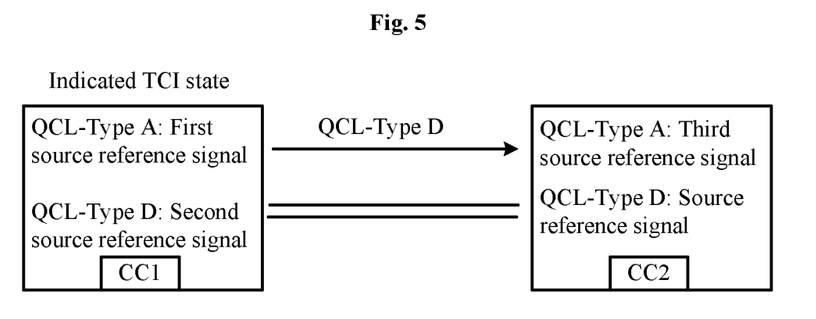
FIG. 5 is a schematic diagram 1 of SSB1 being configured in QCL-Type D of a TCI state applied to CSI-RS2 according to an embodiment of the present disclosure.

2) The first source reference signal (SSB1) is configured in QCL-Type D of a TCI state applied to the third source reference signal (CSI-RS2), as shown in FIG. 5.

Figure 6:
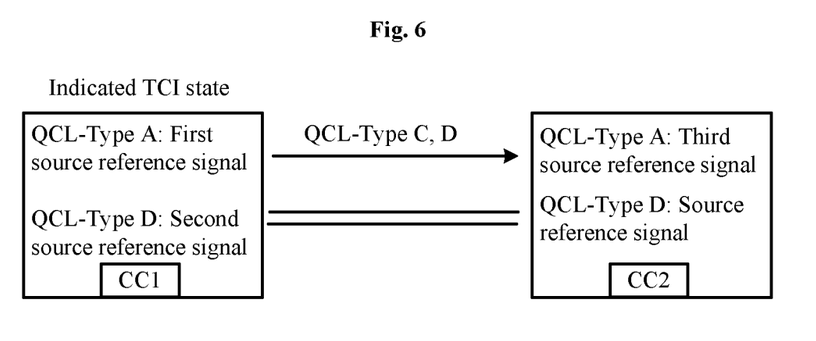
FIG. 6 is a schematic diagram of SB1 being configured in QCL-Type C and QCL-Type D of a TCI state applied to CSI-RS2 according to an embodiment of the present disclosure.

3) The first source reference signal (SSB1) is configured in QCL-Type C and QCL-Type D of a TCI state applied to the third source reference signal (CSI-RS2), as shown in FIG. 6. QCL-Type C represents that the target downlink reference signal and channel and the source reference signal have the same synchronization parameters (such as average delay and Doppler frequency shift).

Figure 7:
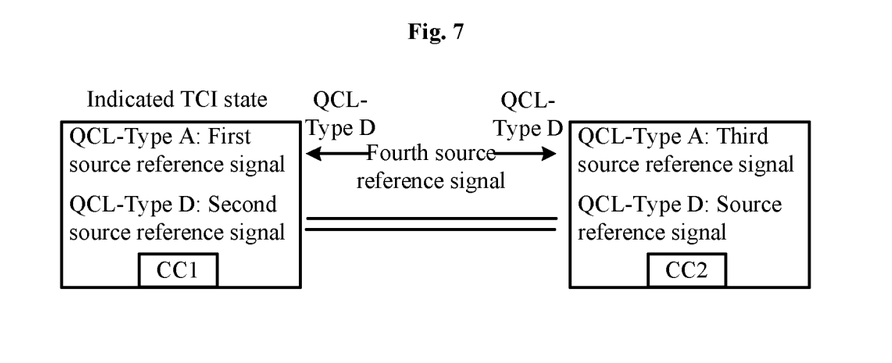
FIG. 7 is a schematic diagram 2 of SSB1 being configured in QCL-Type D of a TCI state applied to CSI-RS2 according to an embodiment of the present disclosure.

If the first source reference signal is CSI-RS3 transmitted on CC1 and SSB1 (assumed to be a fourth source reference signal) is configured in QCL-Type D of a TCI state applied to the first source reference signal (CSI-RS3), then the UE may determine the third source reference signal according to the fourth source reference signal (SSB1) associated with the indicated TCI state and the following (first) preset rule:

4) The fourth source reference signal (SSB1) is configured in QCL-Type D applied to the third source reference signal (CSI-RS2), as shown in FIG. 7.

Further, if CSI-RS2 is a non-periodic CSI-RS and is associated with a periodic reference signal CSI-RS4, then the UE may determine the third source reference signal according to the first source reference signal (SSB1) associated with the indicated TCI state and the following (first) preset rule:

5) Similar to criterion 1), the first source reference signal (SSB1) is configured as a reference signal of the first reference signal (CSI-RS4) associated with the third source reference signal (CSI-RS2). In other words, SSB1 has a mapping relationship with CSI-RS4.

6) Similar to criterion 2), the first source reference signal (SSB1) is configured in QCL-Type D of a TCI state applied to the first reference signal (CSI-RS4) associated with the third source reference signal (CSI-RS2).

7) Similar to criterion 4), the fourth source reference signal (SSB1) is configured in QCL-Type D applied to the first reference signal (CSI-RS4) associated with the third source reference signal (CSI-RS2).

Figure 8:
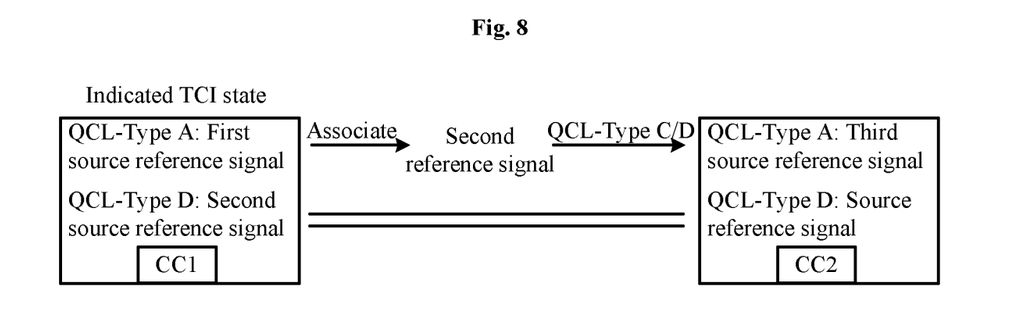
FIG. 8 is a schematic diagram of CSI-RS6 associated with CSI-RS5 being configured in QCL-Type C applied to CSI-RS2 according to an embodiment of the present disclosure.

Further, if the first source reference signal is CSI-RS5 and is associated with a second reference signal CSI-RS6 (e.g. periodic CSI-RS6), and the third source reference signal CSI-RS2 is a non-periodic CSI-RS, then the UE may determine the third source reference signal according to the first source reference signal (CSI-RS5) associated with the indicated TCI state and the following (first) preset rule:

8) The second reference signal (CSI-RS6) associated with the first source reference signal (CSI-RS5) is configured in QCL-Type C applied to the third source reference signal (CSI-RS2), as shown in FIG. 8.

9) The second reference signal (CSI-RS6) associated with the first source reference signal (CSI-RS5) is configured in QCL-Type D applied to the third source reference signal (CSI-RS2), as shown in FIG. 8.

Figure 9:
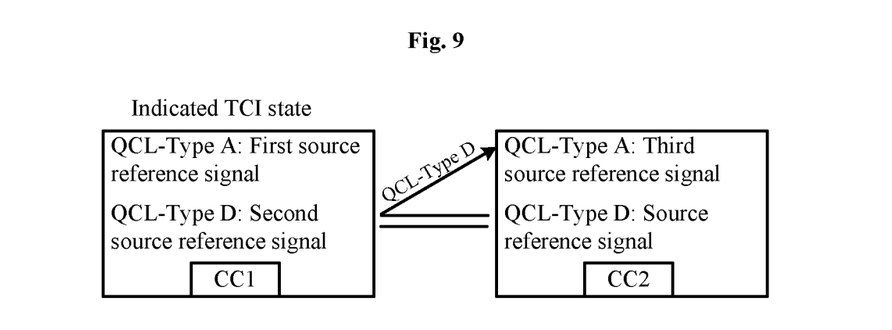
FIG. 9 is a schematic diagram of CSI-RS1 being configured in QCL-Type D of a TCI state applied to CSI-RS2 according to an embodiment of the present disclosure.

Secondly, the UE may also determine the third source reference signal according to the second source reference signal (CSI-RS1) associated with the indicated TCI state and a second preset rule. Further, the second preset rule may include at least one of the following:

1) The second source reference signal (CSI-RS1) is configured in QCL-Type D of a TCI state applied to the third source reference signal (CSI-RS2), as shown in FIG. 9.

Further, if a time domain type of CSI-RS2 is configured to be non-periodic and is associated with a periodic reference signal CSI-RS7, then the UE may determine the third source reference signal according to the second source reference signal (CSI-RS1) associated with the indicated TCI state and the following (second) preset rule:

2) Similar to criterion 1), the second source reference signal (CSI-RS1) is configured in QCL-Type D of a TCI state applied to the third reference signal (CSI-RS7) associated with the third source reference signal (CSI-RS2).

Example 3

The present example provides a QCL hypothesis determination method for a PDSCH of a CC group. It is assumed that a CC group includes CC1 and CC2. SSB1 is transmitted on CC1, and CSI-RS1 is transmitted on CC2. A base station indicates one TCI state for receiving a target PDSCH of the CC group. The TCI state is associated with the following configuration information: a first source reference signal and a second source reference signal. The first source reference signal refers to a source reference signal that is transmitted on a first-type CC and provides a first QCL type, and the second source reference signal refers to a source reference signal that is transmitted on the first-type CC and provides a second QCL type. It is assumed here that the first source reference signal and the second source reference signal are both SSB1. The first-type CC may be a CC with a minimum CC index in the CC group or a primary serving cell (PCell), i.e. CC1. The first QCL type refers to QCL-Type C. The second QCL type refers to QCL-Type D. After a UE receives the above indicated TCI state, SSB1 provides QCL-Type D for a target PDSCH of the first-type CC and the second-type CC. The second-type CC may be a CC other than the first-type CC in the CC group, i.e. the PDSCH of the first-type CC and the PDSCH of the second-type CC have the same receiving beam as SSB1. SSB1 provides QCL-Type C for the target PDSCH of the first-type CC, i.e. the target PDSCH of the first-type CC has the same synchronization parameter as SSB1. For the first QCL type of the target PDSCH of the second-type CC, such as QCL-Type C, the UE may determine a third source reference signal according to the first source reference signal or second source reference signal (SSB1) associated with the indicated TCI state and a third preset rule. The third source reference signal is transmitted on CC2 (assumed to be CSI-RS1), and provides QCL-Type C for the target PDSCH of the second-type CC, i.e. the target PDSCH of the second-type CC and CSI-RS1 have the same synchronization parameter.

Further, the third preset rule may include at least one of the following:

1) The first reference signal (SSB1) or the second source reference signal (SSB1) is configured in QCL-Type C of the third source reference signal (CSI-RS1).

2) The first reference signal (SSB1) or the second source reference signal (SSB1) is configured in QCL-Type D of the third source reference signal (CSI-RS1).

Figure 10:
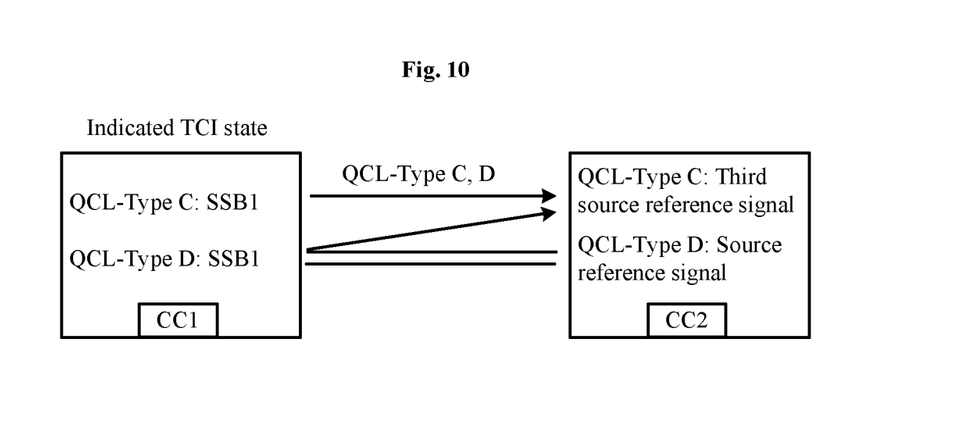
FIG. 10 is a schematic diagram of SSB1 or SSB1 being configured in QCL-Type C and QCL-Type D of CSI-RS1 according to an embodiment of the present disclosure.

3) The first reference signal (SSB1) or the second source reference signal (SSB1) is configured in QCL-Type C and QCL-Type D of the third source reference signal (CSI-RS1), as shown in FIG. 10.

Further, the first source reference signal and the second source reference signal can only include SSBs.

Example 4

The present example provides a QCL hypothesis determination method for a PDSCH of a CC group. It is assumed that a CC group includes CC1 and CC2. CSI-RS1 and CSI-RS2 are transmitted on CC1, and CSI-RS3 is transmitted on CC2. CSI-RS1 and CSI-RS3 are from the same CSI-RS set. A base station indicates one TCI state for receiving a target PDSCH of the CC group. The TCI state is associated with the following configuration information: a first source reference signal (CSI-RS1), a second source reference signal (CSI-RS2), a set of offsets {2} of the first source reference signal, and a set of CC indexes {2} corresponding to the offsets of the first source reference signal. The first source reference signal refers to a source reference signal that is transmitted on a first-type CC and provides a first QCL type, and the second source reference signal refers to a source reference signal that is transmitted on the first-type CC and provides a second QCL type. The first-type CC may be a CC with a minimum CC index in the CC group or a primary serving cell (PCell), i.e. CC1. The first QCL type refers to QCL-Type A or QCL-Type C (it is assumed here that the first QCL type refers to QCL-Type A), and the second QCL type refers to QCL-Type D. The CCs included in a set of CC indexes corresponding to the offsets of the first source reference signal belong to a second-type CC. The first source reference signal indicates a difference value between third source reference signal indexes of these CCs and first source reference signal indexes, and elements included in the set of offsets of the first source reference signal are in one-to-one correspondence with elements included in the set of CCs indexes corresponding to the offsets of the first source reference signal. The third source reference signal is transmitted on the second-type CC, and provides a source reference signal of a first QCL type for a target PDSCH of the second-type CC. Further, the third source reference signal belongs to the same set of reference signals as the first source reference signal. After a UE receives the above indicated TCI state, CSI-RS2 provides QCL-Type D for a target PDSCH of the first-type CC and the second-type CC, i.e. the PDSCH of the first-type CC and the PDSCH of the second-type CC have the same receiving beam as CSI-RS2. The second-type CC may be a CC other than the first-type CC in the CC group. CSI-RS1 provides QCL-Type A for the target PDSCH of the first-type CC, i.e. the target PDSCH of the first-type CC has the same demodulation parameter as CSI-RS1. For the first QCL type, such as QCL-Type A, of the target PDSCH of the second-type CC, the UE may determine a third source reference signal according to the first source reference signal, the set of offsets of the first source reference signal and the set of CC indexes corresponding to the offsets of the first source reference signal, which are associated with the indicated TCI state. As an exemplary implementation, according to a set of CC indexes {2} corresponding to the offsets of the first source reference signal and a set of offsets {2} of the first source reference signal, it can be obtained that the third source reference signal is CSI-RS1+2 transmitted on CC2, i.e. CSI-RS3.

Example 5

The present example provides a QCL hypothesis determination method for a PDSCH of a CC group. It is assumed that a CC group includes CC1 and CC2. CSI-RS1, CSI-RS2, CSI-RS3, CSI-RS4 and CSI-RS5 are transmitted on CC1, and CSI-RS6, CSI-RS7, CSI-RS8, CSI-RS9 and CSI-RS10 are transmitted on CC2. CSI-RS1, CSI-RS2, CSI-RS3, CSI-RS6, CSI-RS7 and CSI-RS8 are configured with TRS-Info. A base station indicates one TCI state for receiving a target PDSCH of the CC group. The TCI state is associated with the following configuration information: a first source reference signal and a second source reference signal (CSI-RS3). The first source reference signal refers to a source reference signal that is transmitted on a first-type CC and provides a first QCL type (e.g. QCL-Type A), and the second source reference signal refers to a source reference signal that is transmitted on the first-type CC and provides a second QCL type (e.g. QCL-Type D). The first-type CC may be a CC with a minimum CC index in the CC group or a primary serving cell (PCell), i.e. CC1. After a UE receives the above indicated TCI state, CSI-RS2 provides QCL-Type D for a target PDSCH of the first-type CC and the second-type CC, i.e. the PDSCH of the first-type CC and the PDSCH of the second-type CC have the same receiving beam as CSI-RS2. The second-type CC may be a CC other than the first-type CC in the CC group. For QCL-Type A of the target PDSCH of the first-type CC and the second-type CC, the UE may determine the first source reference signal and a third source reference signal according to a fourth preset rule. The third source reference signal provides QCL-Type C for the target PDSCH of the second-type CC, i.e. the target PDSCH of the second-type CC and the third source reference signal have the same synchronization parameter.

Further, the fourth preset rule includes:

1) The first source reference signal is a CSI-RS that is transmitted on the first-type CC, has a minimum CSI-RS resource ID and is configured with TRS-Info.

2) The third source reference signal is a CSI-RS that is transmitted on the second-type CC, has a minimum CSI-RS resource ID and is configured with TRS-Info.

Therefore, the UE may determine that the first source reference signal is CSI-RS1 and the third source reference signal is CSI-RS5 according to the fourth preset rule.

Example 6

The present example provides a TCI state obtaining method. The exemplary implementation may be applied to the cases of Examples 2 to 5, but is not limited to the cases involved in these examples.

Before a base station indicates a TCI state for receiving a target PDSCH of a second-type CC, a UE may obtain the indicated TCI state according to a first TCI state in a TCI state set configured by the base station for a reference CC. The reference CC belongs to the same CC group as the first-type CC and the second-type CC involved in Examples 2 to 5. The first TCI state is associated with at least one of following pieces of configuration information: a first source reference signal, a second source reference signal, a set of offsets of a first source reference signal, and a set of CC or BWP indexes corresponding to offsets of a first source reference signal.

Further, the UE may obtain the first TCI state according to at least one of following manners:

1) The first TCI state is the 1st TCI state in the TCI state set.

2) The base station activates one TCI state, i.e. the first TCI state, from the TCI state set via one activation command (e.g. MAC-CE signaling).

Further, the reference CC may include at least one of:

a CC with a minimum CC index in the CC group;

a CC with a minimum interval from an index of the second-type CC in the CC group; and a CC that is closest to a frequency domain position of the second-type CC in the CC group.

Example 7

Figure 11:
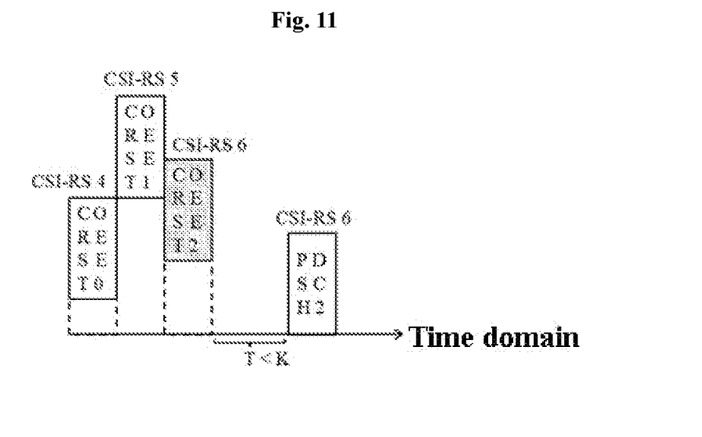
FIG. 11 is a schematic diagram 1 of determination of a reference signal based on a first-type CC according to an embodiment of the present disclosure.

The present example provides a QCL hypothesis determination method for a PDSCH. It is assumed that a CC group includes CC1 and CC2. A UE is configured with three CORESETs: CORESET0, CORESET1 and CORESET2. These CORESETs are on CC1, and DCI located on CORESET2 is used for scheduling PDSCH1 on CC1 and PDSCH2 on CC2. TCI states respectively indicated by a base station for receiving CORESET0, CORESET1 and CORESET2 are TCI state 1, TCI state 2 and TCI state 3. TCI state 1 is associated with the following configuration information: a fifth source reference signal (assumed to be CSI-RS1) and a sixth source reference signal (assumed to be CSI-RS4). TCI state 2 is associated with the following configuration information: a fifth source reference signal (assumed to be CSI-RS2) and a sixth source reference signal (assumed to be CSI-RS5). TCI state 3 is associated with the following configuration information: a fifth source reference signal (assumed to be CSI-RS3) and a sixth source reference signal (assumed to be CSI-RS6). The fifth source reference signal refers to a source reference signal that is transmitted on a first-type CC and provides a first QCL type (e.g. QCL-Type A), and the sixth source reference signal refers to a source reference signal that is transmitted on the first-type CC and provides a second QCL type (e.g. QCL-Type D). The first-type CC may be a CC with a minimum CC index in a CC group or a primary serving cell (PCell), i.e. CC1. In a case where a first preset condition is satisfied, the UE may determine a seventh source reference signal according to the sixth source reference signal (CSI-RS6) associated with TCI state 3 of CORESET2 for scheduling a PDSCH on CC2 on the first-type CC, as shown in FIG. 11, i.e. PDSCH2 and CSI-RS6 have the same receiving beam. The seventh source reference signal refers to a source reference signal providing QCL-Type D for target PDSCH2 of a second-type CC. The second-type CC may be a CC (e.g. CC2) other than the first-type CC in the CC group.

Figure 12:
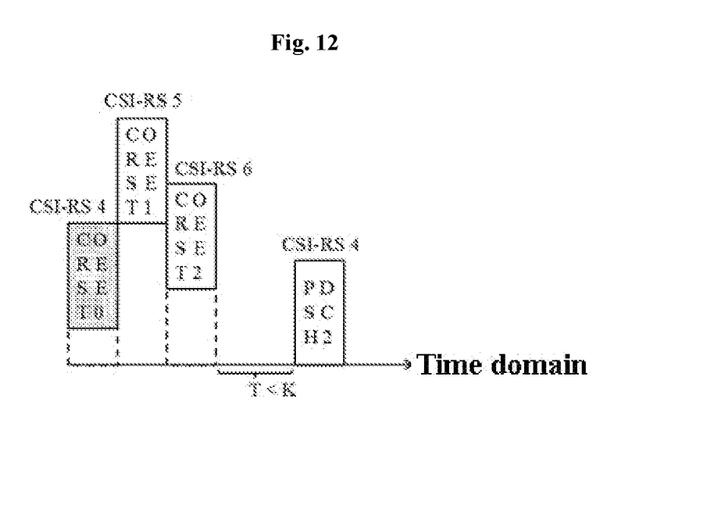
FIG. 12 is a schematic diagram 2 of determination of a reference signal based on a first-type CC according to an embodiment of the present disclosure.

In addition, as shown in FIG. 12, the UE may determine the seventh source reference signal according to the sixth source reference signal (CSI-RS4) associated with TCI state 1 of CORESET0 with a minimum CORESET ID on the first-type CC, i.e. PDSCH2 and CSI-RS4 have the same receiving beam. The closest distance refers to the closest distance to the target PDSCH in a time domain.

Further, the first preset condition includes: a time interval (or scheduling offset) T between a target PDSCH of the second-type CC and a CORESET for scheduling the target PDSCH is smaller than a preset threshold K.

Example 8

The present example provides a QCL hypothesis determination method for a PDSCH of a CC group. It is assumed that a CC group includes CC1 and CC2. A base station indicates one TCI state for receiving a target PDSCH of the CC group (referred to herein as a primary TCI state temporarily), and also indicates one candidate TCI state. Both the primary TCI state and the candidate TCI state are associated with at least one of the following configuration information: a first source reference signal, a second source reference signal, a set of offsets of a first source reference signal, and a set of CC indexes corresponding to the offsets of the first source reference signal. In a case where a first preset condition is satisfied, a UE may determine the third source reference signal involved in Examples 2-5 according to the configuration information associated with the indicated candidate TCI state and the first, second, third and fourth criteria involved in Examples 2-5.

Further, the first preset condition includes: a time interval (or scheduling offset) T between a target PDSCH of the second-type CC and a CORESET for scheduling the target PDSCH is smaller than a preset threshold K.

An embodiment of the present disclosure also provides a storage medium. The storage medium has a computer program stored therein, wherein the computer program, when run, is configured to perform the operations in any one of the above method embodiments.

As an exemplary implementation of the present embodiment, the storage medium may be configured to store a computer program for performing the following operations.

At S1, according to a TCI state indicated by a first communication node for receiving a target downlink reference signal or channel of a second-type CC or BWP, a QCL hypothesis of the target downlink reference signal or channel of the second-type CC or BWP is determined.

As an exemplary implementation of the present embodiment, the storage medium may include, but is not limited to, various media capable of storing a computer program such as a U disk, a ROM, a RAM, a mobile hard disk, a magnetic disk or an optical disc.

An embodiment of the present disclosure also provides an electronic apparatus, which includes a memory and a processor. The memory stores a computer program. The processor is configured to run the computer program to perform the operations in any one of the above method embodiments.

As an exemplary implementation, the electronic apparatus may further include a transmission device and an input/output device, where the transmission device is connected to the processor, and the input/output device is connected to the processor.

As an exemplary implementation of the present embodiment, the processor may be configured to perform the following operations through the computer program.

At S1, according to a TCI state indicated by a first communication node for receiving a target downlink reference signal or channel of a second-type CC or BWP, a QCL hypothesis of the target downlink reference signal or channel of the second-type CC or BWP is determined. It is apparent that those having ordinary skill in the art should appreciate that the above modules and operations of the present disclosure may be implemented by a general-purpose computing device (e.g. a processor), and they may be centralized in a single computing device or distributed on a network composed of multiple computing devices. Optionally, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module to realize. Therefore, the present disclosure is not limited to any particular combination of hardware and software.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A Quasi-Colocation (QCL) hypothesis determination method, comprising:
   receiving, by a second communication node, information according to one Transmission Configuration Indicator (TCI) state sent by a first communication node, wherein the one TCI state corresponds to a component carrier (CC) group;
   determining, according to the one TCI state, a QCL hypothesis of the target downlink reference signal or channel for each CC within the CC group;
   wherein determining that the CC group comprises a first-type CC and a second-type CC, according to a RRC signaling configuration sent by the first communication node; the target downlink reference signal or channel includes a first target downlink reference signal or channel received on the first-type CC, and a second target downlink reference signal or channel received on the second-type CC;
   wherein the one TCI state is associated with following pieces of configuration information: a first source reference signal and a second source reference signal, wherein the first source reference signal refers to a source reference signal that is received on a first-type CC and provides a first QCL type for the first target downlink reference signal or channel: the second source reference signal refers to a source reference signal that is received on the first-type CC and provides a second QCL type for the first target downlink reference signal or channel,
   wherein the first QCL type comprises a QCL-Type A which comprises following QCL hypothesis: Doppler frequency shift, Doppler spread, average delay, and delay spread; and the second QCL type comprises a QCL-Type D which comprises QCL hypothesis of receiving space parameter.

2. The method according to claim 1, wherein
   the second communication node determines a third source reference signal according to a first preset rule and the first source reference signal associated with the one TCI state,
   wherein the third source reference signal refers to a source reference signal that is transmitted on the second-type CC and provides the first QCL type for the second target downlink reference signal or channel.

3. The method according to claim 2, wherein the first preset rule comprises:
   the first source reference signal is configured as a reference signal of the third source reference signal, and there is a mapping relationship between the first source reference signal and the third source reference signal.

4. The method according to claim 1, wherein
   the second communication node determines a third source reference signal according to a third preset rule and the first source reference signal or the second source reference signal associated with the one TCI state,
   wherein the third source reference signal refers to a source reference signal that is transmitted on the second-type CC and provides the first QCL type for the second target downlink reference signal or channel.

5. The method according to claim 4, wherein
   the first source reference signal or the second source reference signal comprises a Synchronization Signal Block (SSB) transmitted on the first-type CC.

6. The method according to claim 1, wherein
   the second communication node determines a third source reference signal according to the first source reference signal associated with the one TCI state, a set of offsets of the first source reference signal, and a set of CC indexes corresponding to the offsets of the first source reference signal,
   wherein the third source reference signal refers to a source reference signal that is transmitted on the second-type CC and provides the first QCL type for the second target downlink reference signal or channel,
   wherein the offset of the first source reference signal comprises source index offset between the first source reference signal and the third source reference signal.

7. The method according to claim 1, wherein
   the second communication node determines the first source reference signal and a third source reference signal according to a fourth preset rule,
   wherein the third source reference signal refers to a source reference signal that is transmitted on the second-type CC and provides the first QCL type for the second target downlink reference signal or channel.

8. The method according to claim 1, wherein
   before the second communication node receives the one TCI state indicated by the first communication node for receiving the target downlink reference signal or channel for each CC within the CC group, the second communication node determines the TCI state according to a first TCI state in a TCI state set configured by the first communication node for a reference CC,
wherein the first TCI state is associated with following configuration information: the first source reference signal, the second source reference signal; and the reference CC, the first-type CC and the second-type CC are configured in a same CC group.

9. The method according to claim 8, wherein the reference CC comprises at least one of:
  a CC with a minimum CC index in the CC group:
  a CC with a minimum interval from an index of the second-type CC in the CC group; and
  a CC that is closest to a frequency domain position of the second-type CC in the CC group.

10. The method according to claim 4, wherein the third preset rule comprises at least one of the following:
  the first source reference signal or the second source reference signal is configured in a first QCL type of a TCI state applied to the third source reference signal;
  the first source reference signal or the second source reference signal is configured in a second QCL type of a TCI state applied to the third source reference signal; and
  the first source reference signal or the second source reference signal is configured in a first QCL type and a second QCL type of a TCI state applied to the third source reference signal.

11. A Quasi-Colocation (QCL) hypothesis determination apparatus, comprising a memory and a processor, wherein the memory stores a computer program, and the processor is configured to run the computer program to:
  receive, by a second communication node, information according to one Transmission Configuration Indicator (TCI) state sent by a first communication node, wherein the one TCI state corresponds to a component carrier (CC) group;
  determine, according to the one TCI state, a QCL hypothesis of the target downlink reference signal or channel for each CC within the CC group;
  wherein determine that the CC group comprises a first-type CC and a second-type CC, according to a RRC signaling configuration sent by the first communication node; the target downlink reference signal or channel includes a first target downlink reference signal or channel received on the first-type CC, and a second target downlink reference signal or channel received on the second-type CC;
  wherein the TCI state is associated with following pieces of configuration information: a first source reference signal and a second source reference signal,
  wherein the first source reference signal refers to a source reference signal that is received on a first-type CC and provides a first QCL type for the first target downlink reference signal or channel: the second source reference signal refers to a source reference signal that is received on the first-type CC and provides a second QCL type for the first target downlink reference signal or channel; and the first-type CC and the second-type CC are configured in a same CC group,
  wherein the first QCL type comprises a QCL-Type A which comprises following QCL hypothesis: Doppler frequency shift, Doppler spread, average delay, and delay spread; and the second QCL type comprises a QCL-Type D which comprises QCL hypothesis of receiving space parameter.

12. A Quasi-Colocation (QCL) hypothesis determination method, comprising:
  sending, by a first communication node, one Transmission Configuration Indication (TCI) state to a second communication node, wherein the one TCI state corresponds to a group of component carriers;
  wherein the TCI state is used for the second communication node to determine a QCL hypothesis of a target downlink reference signal or channel for of each CC within a CC group;
  wherein determining that the CC group comprises a first-type CC and a second-type CC, according to a RRC signaling configuration sent by the first communication node; the target downlink reference signal or channel includes a first target downlink reference signal or channel transmitted on the first-type CC, and a second target downlink reference signal or channel transmitted on the second-type CC;
  sending, by the first communication node, the target downlink reference signal or channel of the second-type CC to the second communication node according to the QCL hypothesis;
  wherein the one TCI state is associated with following pieces of configuration information: a first source reference signal and a second source reference signal,
  wherein the first source reference signal refers to a source reference signal that is transmitted on a first-type CC and provides a first QCL type for the first target downlink reference signal or channel: the second source reference signal refers to a source reference signal that is transmitted on the first-type CC and provides a second QCL type for the first target downlink reference signal or channel; and the first-type CC and the second-type CC are configured in a same CC group,
  wherein the first QCL type comprises a QCL-Type A which comprises following QCL hypothesis: Doppler frequency shift, Doppler spread, average delay, and delay spread; and the second QCL type comprises a QCL-Type D which comprises QCL hypothesis of receiving space parameter.

13. The method according to claim 12, wherein
  the first communication node determines a third source reference signal according to a first preset rule and the first source reference signal associated with the one TCI state,
  wherein the third source reference signal refers to a source reference signal that is transmitted on the second-type CC and provides the first QCL type for the second target downlink reference signal or channel.

14. The method according to claim 12, wherein
  the first communication node determines a third source reference signal according to a third preset rule and the first source reference signal or the second source reference signal associated with the one TCI state,
  wherein the third source reference signal refers to a source reference signal that is transmitted on the second-type CC and provides the first QCL type for the second target downlink reference signal or channel.

15. The method according to claim 14, wherein the third preset rule comprises at least one of the following:
  the first source reference signal or the second source reference signal is configured in a first QCL type of a TCI state applied to the third source reference signal;

the first source reference signal or the second source reference signal is configured in a second QCL type of a TCI state applied to the third source reference signal; and the first source reference signal or the second source reference signal is configured in a first QCL type and a second QCL type of a TCI state applied to the third source reference signal.

16. The method according to claim 15, wherein
the first source reference signal or the second source reference signal comprises a Synchronization Signal Block (SSB) transmitted on the first-type CC.

17. The method according to claim 12, wherein
the first communication node determines a third source reference signal according to the first source reference signal associated with the one TCI state, a set of offsets of the first source reference signal, and a set of CC indexes corresponding to the offsets of the first source reference signal, wherein the third source reference signal refers to a source reference signal that is transmitted on the second-type CC and provides the first QCL type for the second target downlink reference signal or channel, wherein the offset of the first source reference signal comprises source index offset between the first source reference signal and the third source reference signal.

18. The method according to claim 12, wherein
the second communication node determines the first source reference signal and a third source reference signal according to a fourth preset rule, wherein the third source reference signal refers to a source reference signal that is transmitted on the second-type CC and provides the first QCL type for the second target downlink reference signal or channel.

19. The method according to claim 12, wherein
before the second communication node receives the one TCI state indicated by the first communication node for receiving the target downlink reference signal or channel for each CC within the CC group, the second communication node determines the TCI state according to a first TCI state in a TCI state set configured by the first communication node for a reference CC, wherein the first TCI state is associated with at least one of following configuration information: the first source reference signal, the second source reference signal, wherein and the reference CC, the first-type CC and the second-type CC are configured in a same CC group.

20. The apparatus according to claim 11, wherein the processor is configured to run the computer program to:

determine a third source reference signal according to a first preset rule and the first source reference signal associated with the TCI state, wherein the third source reference signal refers to a source reference signal that is transmitted on the second-type CC and provides the first QCL type for the target downlink reference signal or channel.

* * * * *